United States Patent [19]

Roettger et al.

[11] Patent Number: 5,136,296
[45] Date of Patent: Aug. 4, 1992

[54] OBLIQUE SPACED ANTENNA METHOD AND SYSTEM FOR MEASURING ATMOSPHERIC WIND FIELDS

[75] Inventors: Juergen Roettger, Katlenburg-Lindau, Fed. Rep. of Germany; Chao H. Liu, Urbana, Ill.

[73] Assignee: Max-Planck-Gesellschaft zur Foerderung der Wissenschaften E.V., Fed. Rep. of Germany

[21] Appl. No.: 637,446

[22] Filed: Jan. 2, 1991

[30] Foreign Application Priority Data

Jan. 2, 1990 [EP] European Pat. Off. ........ 90100050.5

[51] Int. Cl.⁵ ............................................. G01S 13/95
[52] U.S. Cl. ....................................... 342/26; 342/460
[58] Field of Search ................ 342/26, 460, 461, 117, 342/59

[56] References Cited

U.S. PATENT DOCUMENTS

| | | | |
|---|---|---|---|
| 3,193,825 | 7/1965 | Lhermitte | 342/26 |
| 3,197,768 | 7/1965 | Lhermitte | 342/26 |
| 3,448,613 | 6/1969 | Kastner et al. | 342/26 X |
| 3,715,748 | 2/1973 | Hicks | 342/26 |
| 3,720,949 | 3/1973 | Richter | 342/26 |
| 3,725,914 | 4/1973 | Davidson et al. | 342/26 |
| 3,735,333 | 5/1973 | Balser et al. | 342/26 X |
| 3,881,154 | 4/1975 | Lewis et al. | 342/26 X |
| 3,896,382 | 7/1975 | Magenheim | 342/26 X |
| 3,991,398 | 11/1976 | Andermo et al. | 342/105 X |
| 4,222,265 | 9/1980 | Ravussin | 342/26 X |
| 4,286,462 | 9/1981 | Bourne | 342/26 X |
| 4,481,517 | 11/1984 | Brown | 342/22 |
| 4,647,933 | 3/1987 | Hogg | 342/26 |
| 4,876,551 | 10/1989 | Climent et al. | 342/460 |
| 4,965,573 | 10/1990 | Gallagher et al. | 340/968 |

FOREIGN PATENT DOCUMENTS

3026424 2/1982 Fed. Rep. of Germany.
3739094 5/1989 Fed. Rep. of Germany.

OTHER PUBLICATIONS

Rottger and Larsen: UHF/VHF Radar Techniques for Atmospheric Research and Wind Profiler Applications; in: Radar in Meteorology (D. Atlas, ed.) publ. by Amer. Meteor. Soc., Boston, Mass., 001-047, R2-R47 (1989).
Larsen and Rottger: The Spaced Antenna Technique for Radar Wind Profiling; J. Atmos. Ocean. Techn., 6, 920-938, 1989.
Lhermitte and Atlas: Precipitation Motion by Pulse Doppler; Proc. 9th Weather Radar Conf., Boston, AMS, 218-223, 1961.
Browning and Wexler: The Determination of Kinematic Properties of a Wind Field using Doppler Radar; J. Appln. Meterol., 7, 105-113, 1968.
Koscielny et al.: An Evaluation of the Accuracy of (List continued on next page.)

Primary Examiner—John B. Sotomayor
Attorney, Agent, or Firm—Brumbaugh, Graves, Donohue & Raymond

[57] ABSTRACT

Oblique spaced antenna method and system for measuring atmospheric wind fields within a predetermined volume, wherein a pulsed beam of high frequency radar waves is transmitted in predetermined transmitting directions into the volume of the atmosphere to be investigated, parts of the radar waves which return from the volume to be investigated are received from predetermined receiving directions at a plurality of spaced receiving locations, and the received waves are processed to derive information about the wind velocity within the volume to be investigated, to allow direct determination of parameters of the wind field, such as divergence, vorticity etc.

The transmitting and receiving directions are oblique with respect to the vertical direction.

11 Claims, 3 Drawing Sheets

OTHER PUBLICATIONS some Radar Wind Profiling Techniques; J. Atmos. Ocean. Techn. 1, 309-320, 1984.

Smith and Rabin: Estimation of Divergence in the Pre-storm Boundary layer; J. Atmos. Ocean. Techn. 6, 459-475, 1989.

Hocking, May and Rottger, Interpretation Reliability and Accuracies of Parameters Deduced by the spaced Antenna Method in Middle Atmosphere Applications; PAGEOPH (Journal Pure and Applied Geophysics), 130, 571-604, 1989.

Ecklund et al., Observations of Vertical Motions in the Troposphere and Lower Stratosphere Using Three Closely Spaced ST Radars; Radio Science, 20, 1196-1206, 1985.

Fukao et al.: The MU Radar with an Active Phased-Array-System, 1 and 2; Radio Science, 20, 1155-1168 and 1169-1174, 1985.

Woodman: Spectral Moment Estimation in MST Radars; Radio Science; 20, 1185-1195, 1985.

Patent Abstracts of Japan, vol. 3, No. 66 (E-115), 7th Jun. 1979 and JP-A-54 43 494.

Rottger, Liu, Pan and Franke: New Techniques in the Application of the Spaced Antenna Method for VHF Radar Wind Profilers; Preprint vol. 25th AMS Conf. on Radar Meteor., Feb. 1991.

OBLIQUE SPACED ANTENNA METHOD AND SYSTEM FOR MEASURING ATMOSPHERIC WIND FIELDS

FIELD OF THE INVENTION

The present invention relates to spaced antenna methods and systems for measuring atmospheric wind fields.

DESCRIPTION OF THE RELATED ART

There are basically two methods which are applied by radar systems for investigating the mesophere, stratosphere and troposphere ("MST radars"), in particular to measure wind velocities. One method uses a narrow radar beam pointed into various directions and mesures the Doppler shift of echoes scattered from irregularities. This method is usually called the "Doppler method" and for this reason these radars are also called "Doppler radars". The other method uses three or more spaced antennas and the received echoes are cross-correlated to determine the drift speed of irregularities and is called "spaced antenna or SA method", see e.g. German Patent 3,026,424. Since the irregularities are usually moving with the wind velocity, both methods are capable to measure the wind velocity. Although both methods are basing on the same physical mechanism, in praxis the technical implementation may favour one or the other of these methods. The spaced antenna method can also be applied in the spatial domain radar interferometer mode, which is advantageous for studying the structure of the scattering or reflecting irregularities. In all these applications the use of a phase-coherent radar system is preferred, it is required for the Doppler and the inerferometer methods.

The standard applications of stratosphere-troposphere (ST) radars and windprofilers are explained in the review by Röttger and Larsen (UHF/VHF Radar Techniques for Atmospheric Research and Wind Profiler Applications; in: Radar in Meteorology (D. Atlas, ed.) publ. by Amer. Meteor. Soc., Boston, Mass., 1989). The standard application of the spaced antenna wind-profilers is described in detail by Larsen and Röttger (The Spaced Antenna Technique for Radar Wind Profiling; J. Atmos. Ocean. Techn., 6, 920–938, 1989).

The common Velocity-Azimuth-Display (VAD) method is usually applied to deduce several important kinematic properties of the wind field, such as the mean wind component, the divergence, vorticity, stretching and shearing deformation, the momentum flux and with certain limitations also the mean vertical velocity. These quantities are eminently necessary in many meteorological applications and model initialization for weather forecasting. The VAD method uses the radial velocities measured around a full azimuthal circle with a Doppler radar with oblique beam. It originally was introduced by Lhermitte and Atlas (Precipitation Motion by Pulse Doppler; Proc. 9th Weather Radar Conf., Boston, AMS, 218–223, 1961). Browning and Wexler (The Determination of Kinematic properties of a Wind Field using Doppler Radar; J. Appl. Meterol., 7, 105–113, 1968) recognized the gradients of the wind field across the VAD circle and included them into their evaluations. They expanded the horizontal wind components in a truncated Taylor series and Fourier analyzed the measured radial velocity components to obtain some of the kinematic parameters mentioned above. The VAD method has been extended in many details by several other authors in the following years. It has been impossible, however, to apply it to ST radars and wind profilers, because of the limited beam steering capabilities of these systems as compared to the continuous steerability of the Doppler radars. In the ST radar systems the variation due to the kinematic properties rather had been a source of errors in the determination of horizontal winds due to the very limited beam positions (e.g. Koscielny et al., An Evaluation of the Accuracy of some Radar Wind Profiling Techniques; J. Atmos. Ocean. Techn.,1, 309–320, 1984).

The original VAD method assumes that the horizontal inhomogeneity of the vertical velocity and higher order terms of the Taylor expansion than just the first order term can be neglected. As a consequence, small-scale irregularities in the wind field and the effect of locally varying vertical velocities (particularly when using smaller zenith angles) can lead to considerable uncertainties in the results. These have been intensively studied in the course of the years and the analysis technique has been effectively optimized for the application in Doppler weather radars (e.g., Smith and Rabin, Estimation of Divergence in the Prestorm Boundary Layer; J. Atmos. Ocean. Techn. 6, 459–475, 1989), but still unavoidable shortcomings remain, because only one velocity component, i.e. the projection of the three-dimensional wind velocity vector into the direction of the radar beam, can be measured at a time and a given location. These applications are also limited to Doppler weather radars operating in the SHF bands, which need precipitation ob obtain sufficient signal-to-noise ratios for signal processing.

The ST radars or wind profilers allow detection of echoes from the clear air and are capable to obtain reliable mean wind profiles up to 20–30 km altitude (e.g. Röttger and Larsen, 1989). With the very limited number of beam positions of these clear-air VHF-UHF Doppler ST radars or wind profilers, the information on the described kinematic parameters is not at all accurately deducible. Even with more beam positions still the complete three-dimensional velocity vector can principally not been measured in the same volume.

SUMMARY OF THE INVENTION

The present invention improves the situation substantially by providing a new Spaced Antenna Method and System. Instead of the antenna beam pointing vertically, which is the case in all existing spaced antenna systems and which was so far seen as the only configuration possible in these applications (see the review by Hocking, May and Röttger: Interpretation Reliability and Accuracies of Parameters Deduced by the Spaced Antenna Method in Middle Atmosphere Applications; PAGEOPH (Journ. Pure and Applied Geophysics), 130, 571–604, 1989), the antenna beams are pointed off-vertical into several fixed directions. This has the outstanding advantage that the three-dimensional wind vector can be measured with a single wind profiler at several separated locations. So far a network of at least three locally separated windprofiler systems is applied to measure these quantities (e.g. Ecklund et al., Observations of Vertical Motions in the Troposphere and Lower Stratosphere Using three Closely Spaced ST Radars; Radio Science, 20, 1196–1206, 1985).

Contrary to the standard measurement of just the radial velocity at certain beam positions with the Doppler technique (also called Doppler-Beam-Swinging (DBS) technique), the method according to the invention allows to measure the three-dimensional velocity at these certain beam positions, i.e. at different locations. This avoids to assume the homogeneity of the vertical wind field and even give information on the horizontal shear of the vertical wind when pointing the beams to different locations in addition to the parameters mentioned above. The only limitation, which remains but is not stringent, are the few beam directions, which are usually applied in ST radars and wind profilers. This, however, can be overcome by fast electronic beam steering with an active phased array (such as that one used at the MU Radar facility in Japan, Fukao et al., The MU Radar with an Active Phased-Array System, 1 and 2; Radio Science, 20, 1155-1168 and 1169-1174, 1985).

The method according to the invention, is called "Oblique SA Method" (oblique spaced antenna method=OSA), derives the horizontal wind component with the spaced antenna technique with oblique beams. Vertical beams can be added to improve the resolution. The Oblique SA Method is a new approach since the spaced antenna technique so far was used only with vertical beam antennas. It works very satisfying and furnishes additional information about the wind field which was so far not achievable. The present method provides e.g. reliable and independent estimates of the full horizontal wind vector at a plurality of given, horizontally and vertically separated, locations.

It is to be noted that the new method, the oblique spaced antenna method, also will work for isotropic turbulence scattering, which was so far thought to apply only in the DBS technique (see e.g. Liu, Röttger, Pan and Franke: A Model for Spaced Antenna Observational Mode for MST Radars, Radio Science, 25, 551-563, 1990). This allows to implement the oblique spaced antenna method also with UHF and SHF radar wind profilers which usually rely on istropic scattering.

According to a further improvement the spaced antenna and the Doppler technique (see Röttger and Larsen, 1989, for a description of these techniques used in UHF/VHF radar applications) are combined to obtain also the vertical velocity. This will allow to achieve independent estimates of the three-dimensional velocity at several given, horizontally separated locations. This has the advantage, that three independent wind velocity components at given locations are obtainable, whereas the traditional Doppler-Beam-Swing method yields only one composite component at these locations.

A preferred embodiment of the invention will now be described with reference to the attached drawings.

DESCRIPTION OF THE PREFERRED EMBODIMENT

Figure 1:
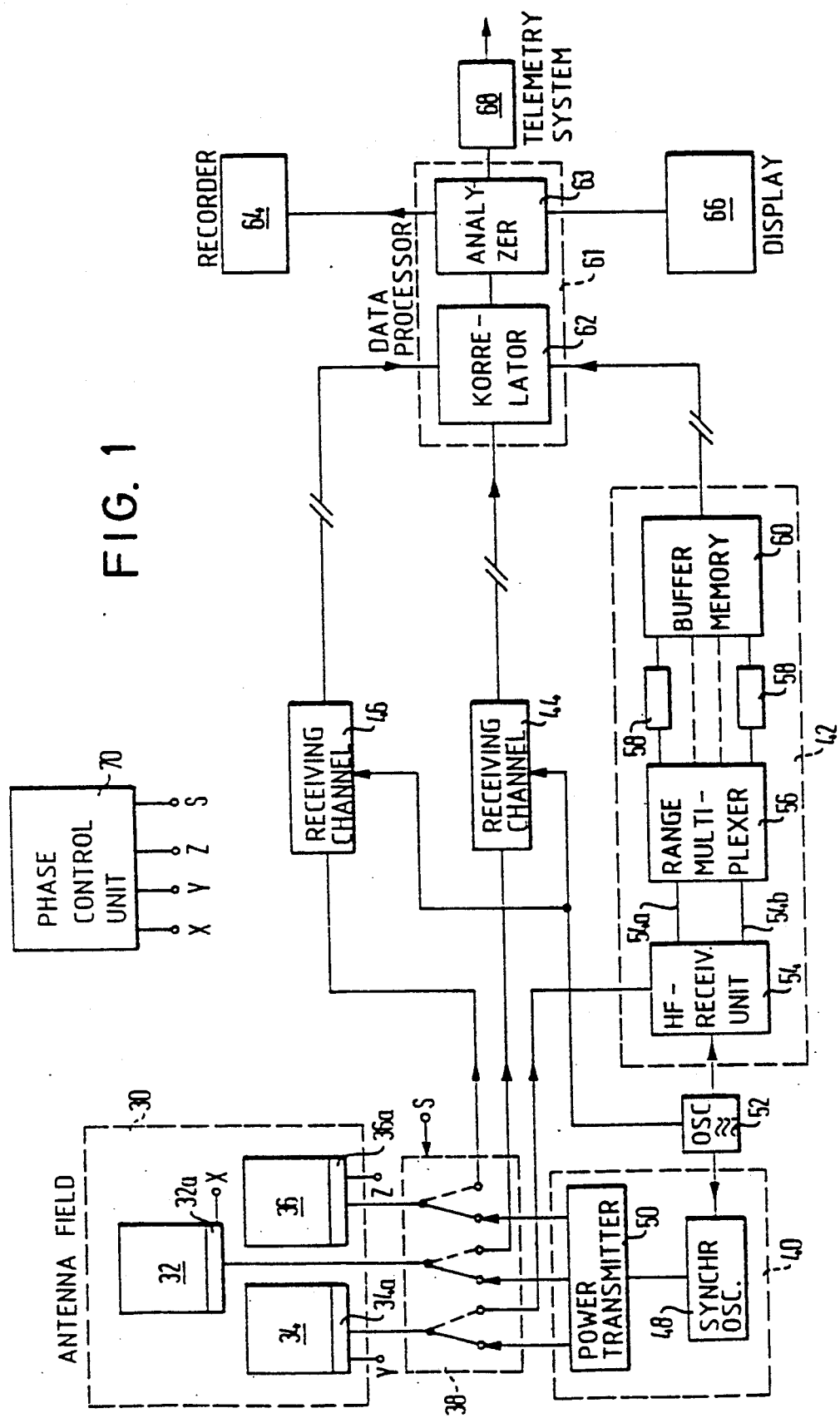
FIG. 1 is a block diagram of a exemplary radar system with which the present oblique spaced antenna method can be performed.

The radar system shown schematically in FIG. 1 is basically known from German Patent 30 26 424. It has an antenna system 30 consisting of three sections 32, 34, 36 which can be operated together as directional transmitting antenna and individually as three spaced directional receiving antennas. The antenna sections 32, 34, 36 are individually coupled to output terminals of a transmitting-receiving (TR) switch 38 which allows to couple the three sections together to a transmitter 40, which includes a synchronized oscillator 48 and modular power transmitter means 50, or alternatively to three individual receiving channels 42, 44, 46. Each receiving channel comprises an usual high frequency (HF) receiving unit 54, a range multiplexer 56, a plurality of low-pass filter or accumulator circuits 58 and a buffer memory 60 connected as shown and operating as described in German Patent 30 26 424. The outputs of the receiving channels 42, 44, 46 are coupled to input terminals of a data processor 61 which includes correlator means 62 for correlating the channel output signals, and an analyzer 63 which receives the output signals of the correlator 62. The analyzer 63 has outputs coupled to a recorder 64, a display monitor 66 and a telemetry system 68. A master oscillator 52 provides a reference oscillation to the synchronized oscillator 48 and the receiving unit 54. The frequency of the radar waves transmitted into a volume of the atmosphere to be investigated and returning by reflection or scattering at discontinuities in the volume is in the UHF/VHF ranges. The preferred wavelength ranges for a MST radar is 6 to 7 m and for a ST radar 6 to 0.1 m. So far described, the system is known.

To make the present system suitable for performing the oblique spaced antenna method, each section 32, 34, 36 of the antenna field is provided with phase shifting means which allow to steer or tilt the beam characteristic of each section so that it points to a desired azimuth angle and a desired angle off the vertical direction. Any suitable phase shifting techniques, e.g. those used in Doppler radar systems, can be applied. The phase shifting means 32a, 34a, 36a are controlled by a phase control unit 70 which may be implemented by a computer system provided for controlling the operation of the radar and which may also synchroneously control the TR switch 38.

Figure 2:
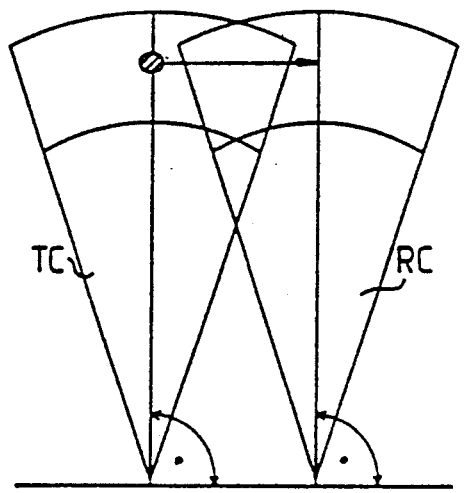
FIG. 2 is a schematic view of the characteristics of a transmitting and a receiving antenna of a known spaced antenna radar system.
Figure 3:
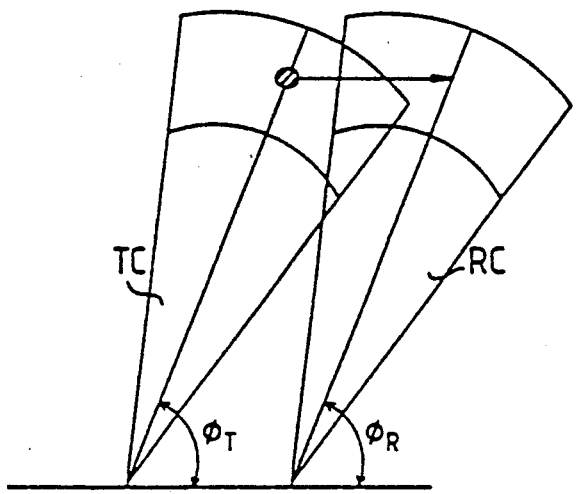
FIG. 3 is a view similar to that of FIG. 2 of an exemplary orientation of the characteristics of the transmitting and receiving antennas of an oblique spaced antenna system according to the invention.

In a test equipment set-up each antenna section 32, 34, 36 comprises three 8×8 yagi arrays of 40×40 m². The operating frequency is 52 Megahertz. The peak transmitted power for each section is 50 kW. The radar beam for each section can be steered by the phase shifting apparatus 32a, 34a, 36a independently to four orthogonal azimuthal directions with a fixed zenith angle of 17° as shown schematically in FIG. 3 and to the conventional vertical direction as schematically shown in FIG. 2. The half-power beam-width HPBW for each section is 7.4° and for the full aperture is 5°. The same tilt angles $\phi_T$ and $\phi_R$ (FIG. 3) of the transmitting and receiving antenna characteristics were used during transmitting and receiving, respectively.

In a test experiment, the radar was set to operate in the following mode: The three independent radar beams were programmed to point vertically for 124.8 s, then simultaneously to the north for 124.8 s and simultaneously to the east for 124.8 s. This process was repeated every 425 s. The pulse repetition frequency was 300 μs, the pulse width 2 μs. Forty range gates were recorded with 1000 coherent integrations.

Velocity estimates were obtained from the Doppler method using the identical data points used in the SAD method to allow for a simultaneous comparison of the two methods. Two 128-point Doppler spectra (corresponding to the same 76.8 seconds of data) were averaged together, and spectral moments were calculated after Woodman (Spectral moment estimation in MST radars; Radio Science, 20, 1185–1195, 1985) for each of three beams. Then the median of the three velocity estimates was used as the estimate of the line-of-sight velocity in that particular beam direction. The horizontal velocity estimate in that beam direction was then obtained by assuming that the vertical wind contribution was negligible and that the line-of-sight velocity was due to contribution of the horizontal wind, i.e. $V_{horiz} = V_{rad} * CSC(17°)$. Thus, an estimate of the horizontal wind for oblique beam directions by both the Doppler and SAD methods was obtained.

Figure 4:
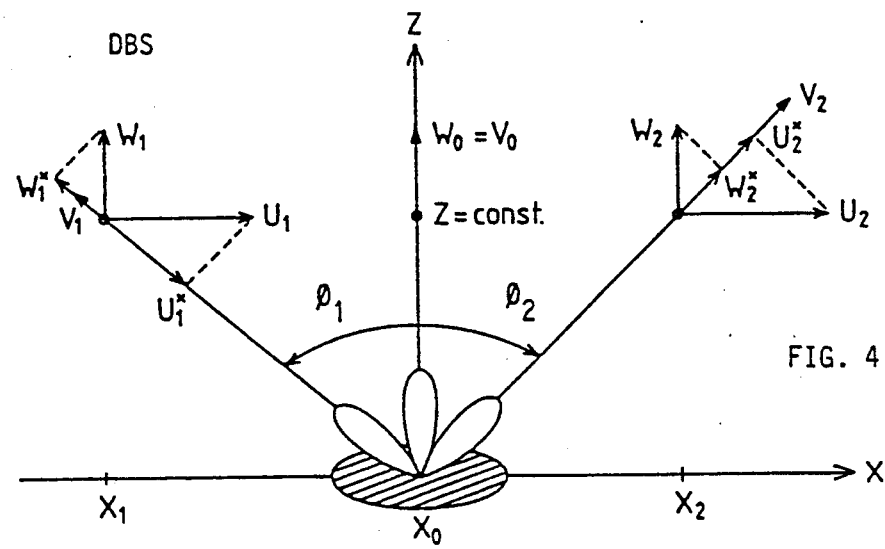
FIG. 4 is a diagram for explaining the Doppler-Beam-Swing (DBS) method.
Figure 5:
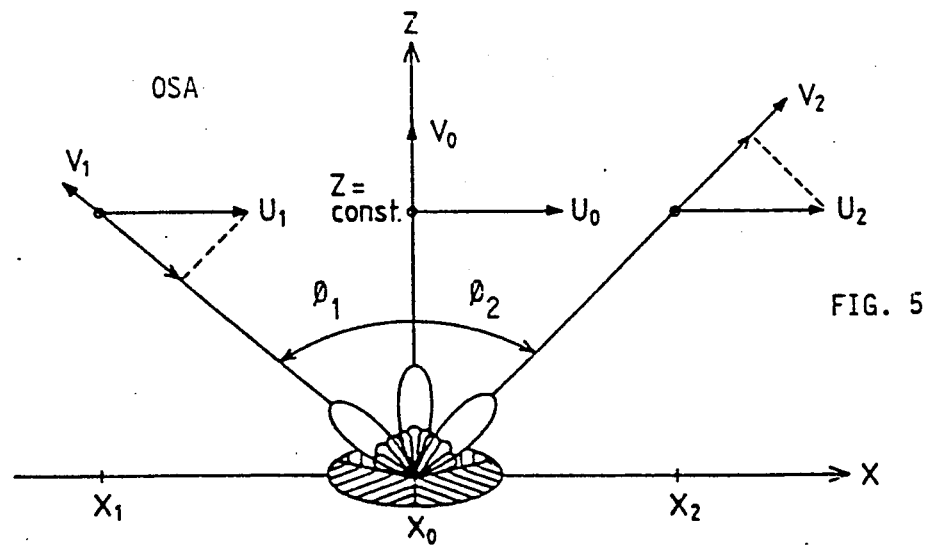
FIG. 5 is a diagram for explaining the present Oblique Spaced Antenna (OSA) method according to the present invention.

The differences between the conventional Doppler Beam Swing method (DBS) and the present Oblique Spaced Antenna method (OSA) will now be explained with reference to FIG. 4 (DBS) and FIG. 5 (OSA). In both cases, only the x-z plane is considered.

Doppler-Beam-Swing Method
Measured quantities:

1) $V_o(\phi_o) = W_o = W$
2) $V_1(\phi_1) = W_1 + V_1 = W_1 \cos\phi_1 + V_1 \sin\phi_1$
3) $V_2(\phi_2) = W_2^* + V_2^* = W_2 \cos\phi_1 + V_2 \sin\phi_2$

Deduced quantities (for constant $z$):

for $\phi_1 = \phi_2 \phi = |\phi_{1,2}|$
$V_1(x_1) = V_2(x_2) = V$
$W_1(x_1) = W_2(x_2) = W = W_o(x_o)$ $$V = \frac{V_1 - V_2}{z \sin\phi}, \quad W = \frac{V_1 + V_2}{z \cos\phi}, \quad W = V_o$$

Relations in bold print indicate needed quantities.

Oblique SA Method
Measured quantities

1) $V_0(\phi_0) = W_0(x_0, z)$   Conventional
   $V_0(\phi_0) = U_0(x_0, z)$   SA method
2) $V_1(\phi_1) = W_1 \sin\phi_1 + U_1 \cos\phi_1$   OSA method
   $U_1(\phi_1) = U_1(x_1, z)$
3) $V_2(\phi_2) = W_2 \sin\phi_2 + U_2 \cos\phi_2$
   $U_2(\phi_2) = U_1(x_2, z)$

Deduced quantities ($z$ = const.)

$$W_1 = \frac{V_1 - U_1 \cos\phi_1}{\sin\phi_1}$$

$$W_2 = \frac{V_2 - U_2 \cos\phi_2}{\sin\phi_2}$$

Relations in bold print indicate needed quantities.

Immediate consequences ($z$ = const)

A) *DBS* 1) One oblique beam $\phi_1 = \phi$
   Assumption:
   $|W_1 \cos\phi| |U_1 \sin\phi|$
   then: $U = V_1/\sin\phi$ 2) One oblique beam $1_1$ +
   one vertical beam $\phi_0 = 0$
   Assumption:
   $W_0 = W_1 = W$ $$U = \frac{V_1 \ W \cos\phi_1}{\sin\phi_1}$$

3) Two oblique beams $\phi_1 = -\phi_2$
   Assumption: $|\phi_1| = |\phi_2| = \phi$
   $W_1 = W_2 = W$
   $U_1 = U_2 = U$ $$U = \frac{V_1 - V_2}{2 \sin\phi} \quad W = \frac{V_1 + V_2}{2 \cos\phi}$$

It follows: *DBS* works only if the assumptions in bold print are valid. $W$ and $U$ are "mean" values of the vertical and horizontal ($x$) wind components.

B) *OSA* method: No Assumptions.
   Yield:
   $W_0(x), W_1(x_1), W_2(x_1)$
   $U_0(x_0), U_1(x_1), U_2(x_1)$.

Applications

Usually, the real wind velocity field is characterized by $W_0 \neq W_1 \neq W_2$ $U_0 \neq U_1 \neq U_2$ due to the field inhomogenity namely divergence, vorticity, shear etc. caused by various dynamical meterological processes. This causes (known) uncertainties when deducing the wind field by the DBS method. These uncertainties can be verified by the OSA method, thus yielding correct estimates of mean wind and allowing deduction of divergence and the like.

EXAMPLE $U_2 = U_1 + U,$ $W_2 = W_1 + W.$

This yields with the DBS method:

$$U = \frac{V_1 - V_2 + \Delta W \sin\phi - \Delta U \cos\phi}{2 \cos\phi}$$

since $\Delta W$ and $\Delta U$ are not known, $U$ can be measured only as mean value with unknown error.

With the OSA method it yields:

$U_1, U_2, W_1, W_2$, (without the error of the OSA method)

$U = U_2 - U_1, \quad W = W_2 - W_1$ and consequently the divergences $$\frac{\Delta U}{\Delta x} = \frac{U_2 - U_1}{x_2 - x_1} \quad \text{and} \quad \frac{\Delta W}{\Delta x} = \frac{W_2 - W_1}{x_2 - x_1}.$$

This can be continued for more components of the three-dimensional wind field, such as divergence, vorticity, stretching and shearing deformation, momentum flux and mean vertical and horizontal wind velocity, etc.

The minimum angle of the oblique beam(s) relative to the vertical direction is preferably greater than the half power beam width. The transmitter means may comprise a set of phase synchroneous transmitters.

We claim:

1. Spaced antenna method for measuring a three-dimensional, wind-velocity vector field within a predetermined area of the atmosphere, said method comprising the steps of:
    a) transmitting a pulsed transmitter beam of radar waves in a predetermined transmitting direction into a predetermined volume of said area of the atmosphere, said transmitting direction being oblique in zenith angle with respect to the vertical direction and having predetermined zenith and azimuthal angles;
    b) receiving, at a plurality of spaced receiving locations, portions of said radar waves which return from said volume, said reception being effected at each location along a receiving direction which is parallel to said transmitting direction;
    c) processing said received waves to obtain full wind-vector information of said volume;
    d) changing at least one of said zenith and azimuthal angles;
    e) repeating steps a) to c) at least once to derive wind-vector information of at least one other volume of said area; and
    f) processing said wind-vector information obtained to derive said wind-velocity vector-field information of said area.

2. The method as claimed in claim 1 wherein each of said transmitting and receiving directions form an angle of more than the beam width with respect to the vertical direction.

3. The method as claimed in claim 1, wherein said processing includes a correlation procedure.

4. The method as claimed in claim 1 characterized by determining from spaced antenna cross correlation functions with oblique beam pointing, kinematic parameters of the wind field, said parameters including divergence, vorticity, shearing and stretching deformation and momentum flux.

5. A spaced-antenna radar system comprising:
    a directional transmitting antenna having a directional characteristic for transmitting a beam of high frequency radar waves in a predetermined transmitting direction into the atmosphere;
    a plurality of spaced, directional receiving antennas each having a directional characteristic for receiving radar waves;
    means for directing the directional characteristics of the transmitting and receiving antennas to at least one direction which is oblique with respect to the vertical direction;
    high frequency transmitter means;
    means for coupling said transmitter to said transmitting antenna;
    receiver means;
    means for coupling each of said receiving antennas to said receiver means; and
    signal processing means coupled to receive output signals from said receiver means.

6. The system as claimed in claim 5, wherein said transmitter means comprises a set of phase-synchroneous transmitters.

7. The system as claimed in claim 6, wherein said means for directing the antenna characteristics is adapted to point the antenna characteristics in a direction which forms an angle of at least the half-power beam width with the vertical direction.

8. The system as claimed in claim 5, wherein each of said antennas comprises a plurality of antenna elements and that means for directing said antenna characteristics comprises phase shifting means.

9. The system as claimed in claim 5, wherein said means for directing the antenna characteristics is adapted to direct the antenna characteristics to at least two different azimuthal directions.

10. The system as claimed in claim 9, wherein said means for directing the antenna characteristic is adapted to direct the antenna characteristic to four orthogonal or more than four azimuthal directions.

11. The system as claimed in claim 5, wherein said signal processing means comprises correlator means.

* * * * *